United States Patent [19]

Strong

[11] Patent Number: 4,711,075
[45] Date of Patent: Dec. 8, 1987

[54] INTEGRALLY MOUNTED POSITIONABLE CONCAVE EXTENSION

[75] Inventor: Russell W. Strong, Brugge, Belgium

[73] Assignee: New Holland Inc., New Holland, Pa.

[21] Appl. No.: 858,159

[22] Filed: May 1, 1986

[51] Int. Cl.⁴ ............................................. A01F 12/00
[52] U.S. Cl. .................................. 130/27 J; 130/27 L
[58] Field of Search ................... 130/27 L, 27 T, 27 J

[56] References Cited

U.S. PATENT DOCUMENTS

| 792,986 | 6/1905 | Henderson | 130/27 J |
|---|---|---|---|
| 3,696,815 | 10/1972 | Rowland-Hill et al. | 130/27 T |
| 4,004,404 | 1/1977 | Rowland-Hill et al. | 130/27 T |
| 4,031,901 | 6/1977 | Rowland-Hill | 130/27 T |
| 4,078,571 | 3/1978 | Todd et al. | 130/27 T |
| 4,249,543 | 2/1981 | Rowland-Hill | 130/27 T |

FOREIGN PATENT DOCUMENTS

| 92599 | 11/1983 | European Pat. Off. | 130/27 J |
|---|---|---|---|
| 214559 | 8/1941 | Switzerland | 130/27 L |

Primary Examiner—James A. Leppink
Assistant Examiner—Matthew Smith
Attorney, Agent, or Firm—Larry W. Miller; Frank A. Seemar; Darrell F. Marquette

[57] ABSTRACT

An improved concave extension for use with an arcuate concave cooperable with a threshing and separating rotor in an axial flow combine is disclosed wherein the sub-frame assembly of the concave extension is provided with a mounting clevis rotatably engageable with one of two mounting pins extending from the concave frame members to permit the concave extension to be rotated relative to the concave frame members. The subframe assembly is also provided with a hole therein alignable with a plurality of openings in the respective concave frame members to permit the use of a fastener extending through the hole in one of the aligned openings to fix the position of the concave extension relative to the concave frame members, thereby providing variable configurations of the rub bars on the concave extension relative to the rub bars of the concave. A filler plate is rotatably mounted to the forwardmost concave frame member and positionable relative to both the concave frame member and the concave extension. The concave extension and filler plate are easily positionable and/or removable by manipulation of two bolts interengaging the sub-frame assembly and the respective concave frame members.

11 Claims, 6 Drawing Figures

INTEGRALLY MOUNTED POSITIONABLE CONCAVE EXTENSION

BACKGROUND OF THE INVENTION

The present invention relates generally to axial flow combines and, more particularly, to a multi-positionable concave extension mounted on the concave and cooperable with a threshing and separating rotor to optimally remove grain from crop material.

Concave extensions such as those found in U.S. Pat. No. 4,004,404 granted on Jan. 25, 1977, to E. W. Rowland-Hill et al and in U.S. Pat. No. 4,031,901, granted on June 28, 1977, to E. W. Rowland-Hill, which are more specifically described in U.S. Pat. No. 3,696,815, granted on Oct. 10, 1972, to E. W. Rowland-Hill et al, are utilized to supplement the threshing areas of the main concaves used in axial flow combines. Such concave extensions do not allow for different positions of the rub bars thereof for varying crop characteristics and do not move with the concave when the concave is positionally moved to a different setting relative to the threshing and separating rotor. Furthermore, it would be desirable to provide a concave extension that would mount independently of the main frame of the combine, yet permit the extension to be rigidly secured for use in a threshing mold, be variably positionable relative to the concave, but be movable with the concave and be easily removable from the combine.

SUMMARY OF THE INVENTION

It is an object of this invention to overcome the aforementioned disadvantages of the prior art by providing a concave extension integrally mounted on the concave frame members and positionable relative thereto.

It is another object of this invention to provide a concave extension that is positionable with the concave for different concave settings, yet positionable relative to the concave to provide varying rub bar configurations.

It is a feature of this invention that different concave extensions can be utilized for different crop conditions.

It is an advantage of this invvention that the concave extesion can be easily removed from the concave.

It is another feature of this invention that the concave extension can be rigidly secured to the concave frame members to supplement the threshing area of the concave when in a threshing mode.

It is another advantage of this invention that the concave extension is mounted independently of the main frame of the combine.

It is still another object of this invention to optimize the operating performance of a concave extension by providing variable positions thereof relative to the concave.

It is yet another object of this invention to provide a filler plate positionally movable relative to the concave extension and the concave frame member to permit a positioning thereof for proper corresponding position relative to the concave extension.

It is yet another advantage of this invention that the setting of the concave extension is varied with the setting of the concave relative to the cooperating threshing and separating rotor.

It is still another feature of this invention that the concave extension can be quickly and easily removed from the concave by the manipulation of two bolts.

It is yet another feature of this invention that a clevis and pin mounting mechanism between the concave extension and the concave frame members facilitate the rotated position of the concave extension relative to the concave frame members.

It is a further object of this invention to provide a concave integrally mounted on the concave frame members and positionable relative thereto.

It is yet a further object of this invention to provide a concave extension for use in an axial flow combine that is durable in construction, inexpensive of manufacture, carefree of maintenance, facile in assemblage and simple and effective in use.

These and other objects, features and advantages are accomplished according to the instant invention by providing an improved concave extension for use with an arcuate concave cooperable with a threshing and separating rotor in an axial flow combine wherein the sub-frame assembly of the concave extension is provided with a mounting clevis rotatably engageable with one of two mounting pins extending from the concave frame members to permit the concave extension to be rotated relative to the concave frame members. The sub-frame assembly is also provided with a hole therein alignable with a plurality of openings in the respectivve concave frame members to permit the use of a fastener extending through the hole in one of the aligned openings to fix the position of the concave extension relative to the concave frame members, thereby providing variable configurations of the rub bars on the concave extension relative to the rub bars of the concave. A filler plate is rotatably mounted to the forwardmost concave frame member and positionable relative to both the concave frame member and the concave extension. The concave extension and filler plate are easily positionable and/or removable by manipulation of two bolts interengaging the sub-frame assembly and the respective concave frame members.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 1:
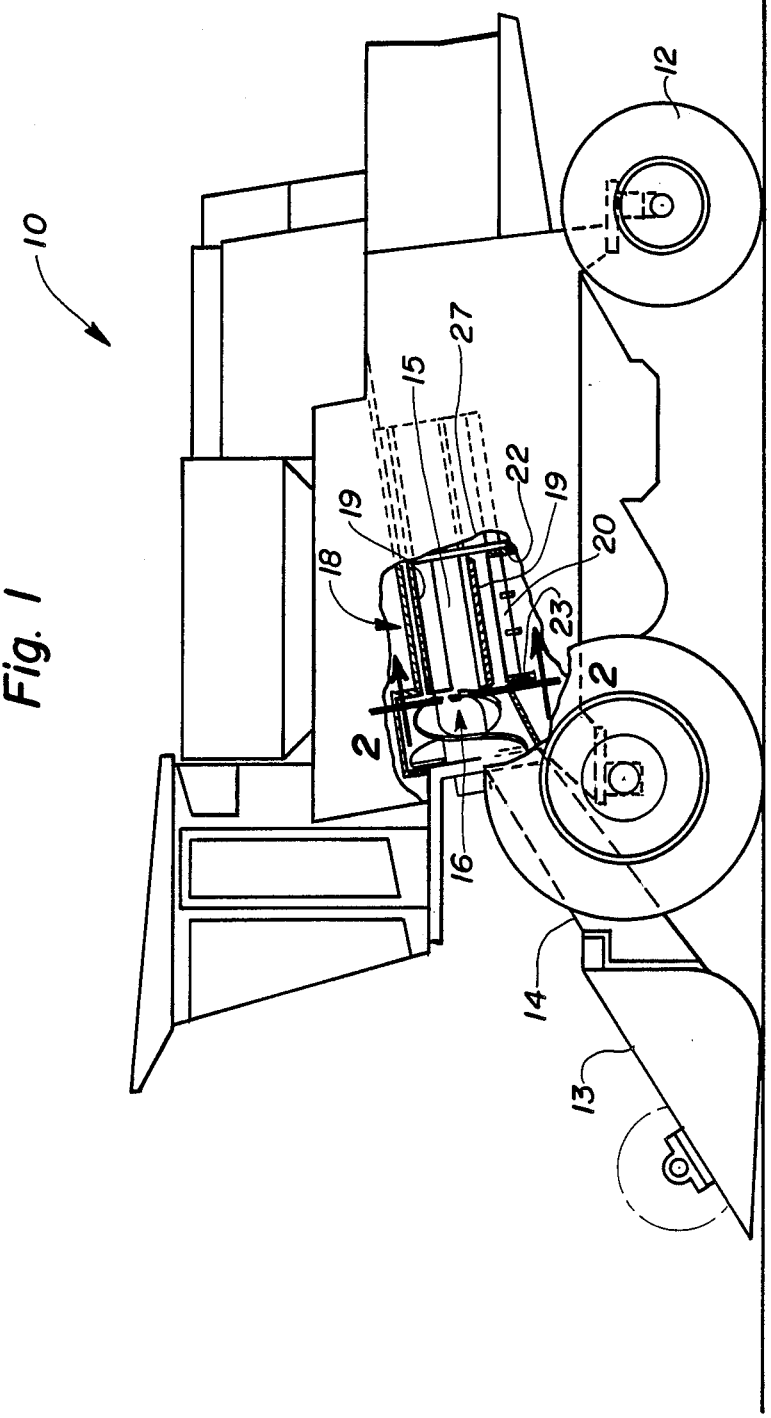
FIG. 1 is a left side elevational view of a combine harvester incorporating the principles of the instant invention, a portion of the side sheet of the combine being broken away to reveal the threshing and separating rotor and associated concaves housed therewithin.

Referring now to the drawings and, particularly, to FIG. 1, a left side elevational view of a crop harvesting machine, commonly referred to as a combine harvester, incorporating the principles of the instant invention can be seen. The combine harvester 10 includes a wheeled frame 12 to permit movement of the combine over the ground G. A header 13 is supported from the frame 12 forwardly of the combine 10 to receive standing crop material from the ground G and convey it rearwardly into a feeder house structure 14 that is operable to convey a flow of crop material into the infeed area 16 of the threshing and separating rotor 15. The crop material is fed between the rotor 15 and the concave 20 where rasp bar assemblies 19 will thresh the crop against the concave 20 within the threshing area 18. The harvesting operation of such an axial flow combine is well known in the art and is described, for example, in U.S. Pat. No. 3,916,912, granted Nov. 4, 1975, to E. W. Rowland-Hill.

Figure 2:
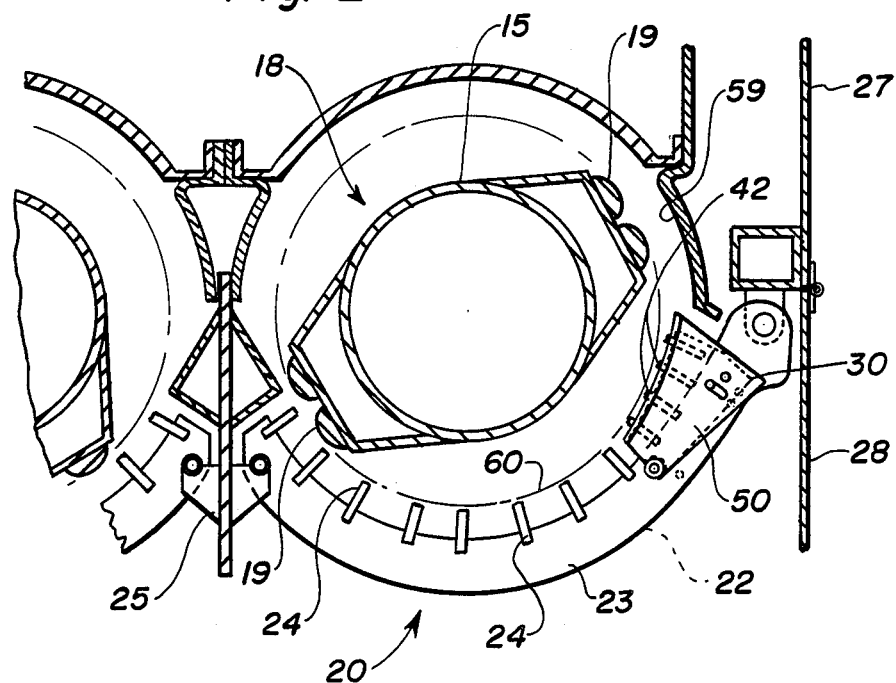
FIG. 2 is a partial cross-sectional view of the threshing and separating area taken along lines 2—2 of FIG. 2 to show the relationships between the threshing and separating rotor and the concave and concave extension.
Figure 3:
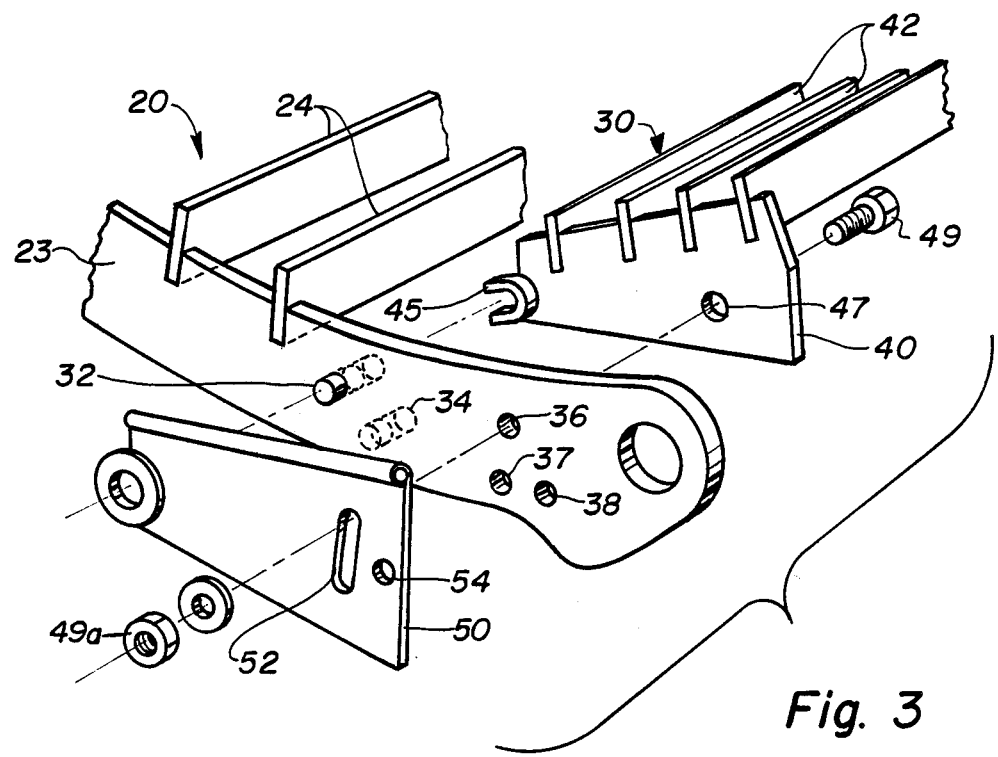
FIG. 3 is an enlarged exploded view of the forwardmost portion of the concave frame member to show the mounting of the concave extension and filler plate thereto.

Referring now to FIGS. 2 and 3, the structural details of the concave extension 30 can best be seen. The cross-sectional view of FIG. 2 best shows the positional relationships between the threshing and separating rotor 15 and the concave 20. The concave 20 is provided with arcuate frame members 22 supporting a plurality of fore-and-aft extending rub bars 24 cooperable with the rasp bar assemblies 19 mounted on the rotor 15 to separate the grain from crop material as noted above. The concaves 20 are mounted in a sub-frame assembly 25 that is adjustable to permit positional settings of the concave 20 relative to the rotor 15 to provide variable spacing between the rasp bar assemblies 19 and the rub bars 24. One type of adjustable concave support which is equally applicable to the apparatus shown in FIGS. 1 and 2 is describd in greater detail in U.S. Pat. No. 4,375,221, granted on Mar. 1, 1983, to R. P. Bernhardt et al, the description portions of which are hereby incorporated by reference.

The concave extension 30 is mounted between two longitudinally spaced concave frame members 22, the forwardmost of which is designated by the reference numeral 23, adjacent the side sheets 27 of the combine harvester 10. Access to the concave extensions 30 can be gained through the access door 28 and the respective side sheets 27. The mounting of the concave extension 30 to the forwardmost concave frame member 23 is shown in the exploded view of FIG. 3. The mounting of the concave extension 30 to the rearwardly spaced concave frame member 22 is substantially identical to that shown with respect to the forwardmost frame member 23 in FIG. 3.

The forwardmost concave frame member 23 is provided with a first mounting pin 32 which projects fore-and-aft of the frame member 23 for reasons to be described in greater detail below. The forwardmost frame member 23 also includes a second mounting pin 34 spaced radially outwardly with respect to the rotor 15 from the first mounting pin 32. The forwardmost frame member 23 is also provided with a number of openings 36,37,38 therethrough to be utilized as a securing means also described in greater detail below.

The concave extension 30 is comprised of a sub-frame assembly 40 supporting a number of longitudinally mounted rub bars 42 positioned in a parallel fashion similar to the concave rub bars 24. The sub-frame assembly 40 is equipped with a clevis 45 of a size to be engageable with one of the mounting pins 32,34 to permit rotational movement of the sub-frame 40 relative to the concave frame members 22,23. The sub-frame assembly 40 is also provided with a hole 47 extending therethrough to be alignable with the openings 36,37,38 in the concave frame members 22,23 when the clevis 45 is mounted on one of the mounting pins 32,34 as is described with respect to FIGS. 4-6 below. A fastener 49 is interengageable with the hole 47 and one of the aligned openings 36,37,38 to positionally fix the extension 30 relative to the concave frame members 22,23. The nut portion 49a could be in the form of a series of nuts (not shown) welded to the frame members 22,23 at the openings 36,37,38 if the filler plate 50 were not used.

A filler plate 50 is mounted on the first mounting pin 32 forwardly of the forwardmost concave frame member 23 to be rotatable thereon relative to both the forwardmost concave frame member 23 and the concave extension 30. The filler plate 50 is provided with a slotted hole 52 alignable with the openings 36,37 in the forwardmost frame member 23 so as to be engageable with the fastener 49 to fix the rotatative position of the filler plate 50 relative to the concave extension 30 as desired. The filler plate 50 is also provided with a second hole 54 therethrough to be alignable with the third opening 38 to positionally fix the filler plate 50 against the forwardmost frame member 23 when the concave extension 30 is in its withdrawn position as described with respect to FIG. 6 below.

Figure 4:
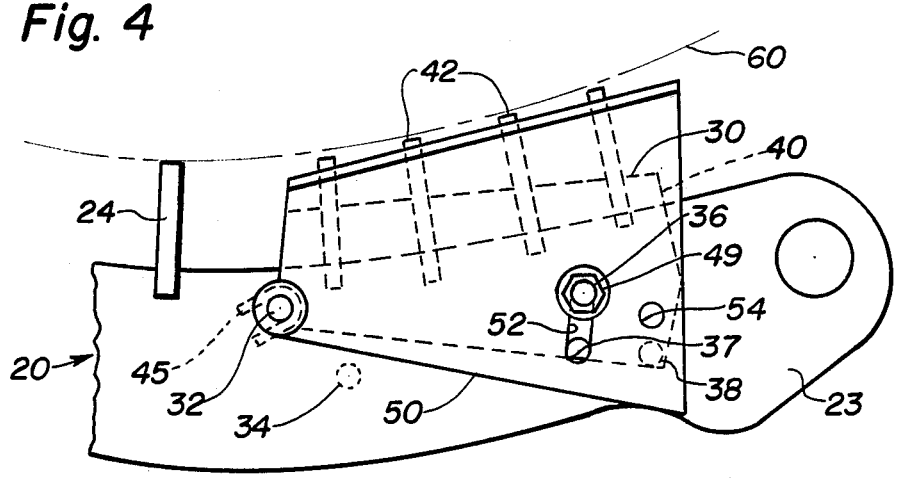
FIG. 4 is an enlarged detail view of the concave extension mounting on the forwardmost concave frame member as seen in FIG. 2 with the concave extension in the thresh position.
Figure 5:
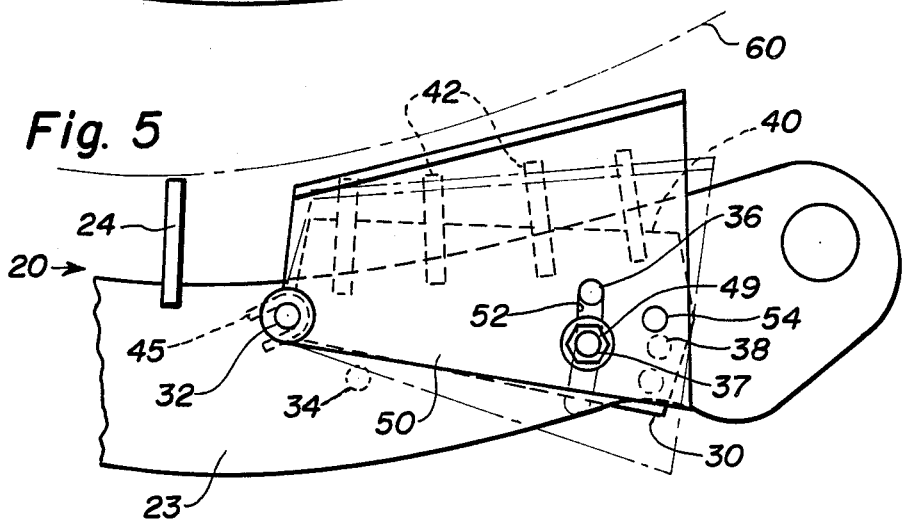
FIG. 5 is an enlarged detail view similar to that of FIG. 4 with the concave extension in a swept position, the rotative movement of the filler plate being shown in phantom.
Figure 6:
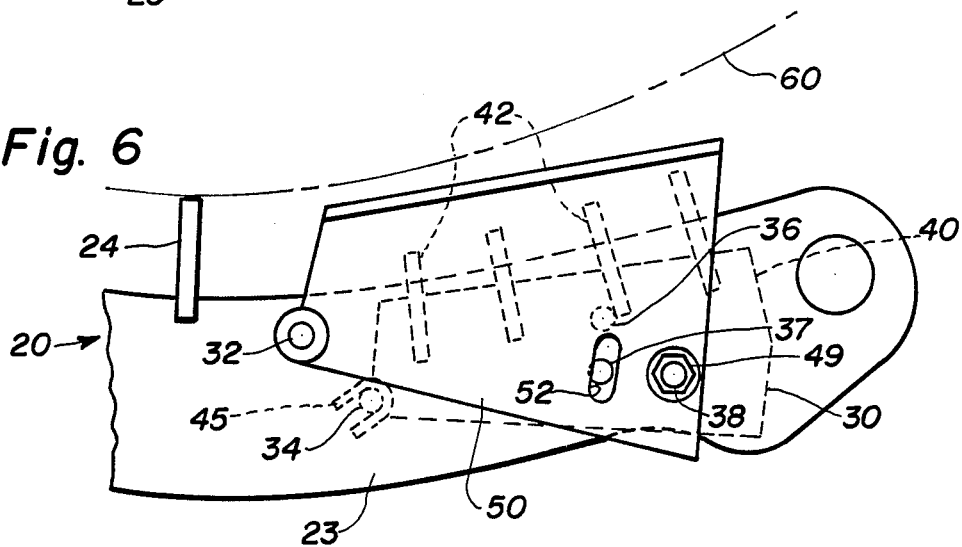
FIG. 6 is an enlarged detail view similar to that seen in FIGS. 4 and 5 with the concave extension in a withdrawn position.

The positional movements of the concave extension 30 and the filler plate 50 are best shown in FIGS. 4-6. The thresh position of the concave extension 30 is shown in FIG. 4. The clevis 45 is mounted on the first mounting pin 32 while the hole 47 is aligned with the first opening 36 and locked into position by the fastener 49 to position the concave extension 30 in close proximity to the rasp bar assemblies 19 similar to the rub bars 24 of the concave 20. The path of movement of the periphery of the rasp bar assemblies is depicted by the arcuate line 60. in the position depicted in FIG. 4, the concave extension 30 operates as an additional threshing area for the concave 20 and provides supplemental threshing action for the rotor 15. The filler plate 50 is locked in its uppermost position to block the front of the concave extension 30 in a similar manner as the forwardmost frame member 23 does with the rub bars 24.

The swept position for the concave extension 30 is depicted in FIG. 5. The clevis 45 is again mounted on the first mounting pin; however, the hole 47 is aligned with the lower opening 37 to rotatably drop the concave extension 30 in a position extending almost tangentially to the path of travel 60 of the rasp bar assemblies 19. The filler plate 50 can be adjiusted in the manner shown in phantom in FIG. 5. The operation of the concave extension 30 in this swept position provides partial threshing but also provides a transition mode between the concave and the rotor cover 59 which is positioned radially outwardly with respect to the rotor 15 further than the concave 20 can be seen in FIG. 2. This particular configuration has been found to reduce plugging and provide good separation in certain crop conditions where it is advantageous for the rotors 15 to provide a sweeping action to the rub bars 42 in the concave extension 30.

The concave extension 30 is also positionable in a withdrawn position as shown in FIG. 6. The clevis 45 is mounted on the second mounting pin 34 and the hole 47 is aligned with the third opening 38 to completely drop the concave extension 30 out of engagement with the rasp bar assemblies 19. The filler plate 50 is also positioned with the fastener 49 extending through the second hole 54 to lock the filler plate 50 in its shown rotated position which provides a transition from the infeed portion 16 of the threshing and separating rotor 15. By placing the concave extension 30 in this withdrawn position, the rotor 15 can be operated at a maximum power efficiency.

By mounting the concave extension 30 directly to the concave frame members 22,23, the concave extension 30 is positionally set with the concave 20 by the support 25 whenever a variable setting relative to the rasp bar assemblies 19 is desired. A removal of two bolts, one each engaging the forwardmost concave frame member 23 and the rearwardly spaced frame member 22, permits a quick positioning to any one of the three positions described above. Access to the concave extension 30 can be easily gained through the access door 28 in the combine side sheet 27 to affect servicing and/or removal of the concave extension 30.

It will be understood that changes in the details, materials, steps and arrangement of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description may be employed in other embodiments without departing from the scope of the invention. Accordingly, the following claims are intended to protect the invention broadly, as well as in the specific form shown.

Having thus described the invention, what is claimed is:

1. In an axial flow combine harvester having a mobile frame adapted for movement over the ground and a threshing and separating rotor rotatably supported by said frame and including rasp bar assemblies cooperable with circumferentially mounted concaves to remove grain from crop material fed between said concave and said rotor, said concave having a plurality of rub bars mounted between spaced-apart arcuate frame members supported by said mobile frame adjacent said rotor, the improvement comprising:
a concave extension having a number of rub bars mounted in a subframe assembly and detachably connectable to said concave frame member, said concave extension having a first end provided with engagement means cooperable with each of at least two mounting members carried by each of said concave frame members and radially spaced with respect to said rotor to permit a rotative movement of said subframe assembly relative to said concave frame members and a second end provided with a hole therethrough and alignable with a number of spaced apart openings in said concave frame members upon rotation of said subframe assembly about said engagement means, both said first end and said second end of said concave extension being selectively positionable relative to said concave by the selective mounting of said engagement means on a selected one of said mounting members and by a fastener interengaging said hole and one of said aligned openings such that the concave extension rub bars are positionable as a unit in variable configurations with respect to the concave rub bars.

2. The combine harvester of claim 1 wherein said engagement means is selectively engageable with either of said mounting members, said hole being alignable with a portion of said openings when said engagement means is engaged with one of said mounting members and alignable with another portion of said openings when said engagement means is engaged with the other said mounting member, thereby permitting a number of adjustment positions of said concave extension relative to said concave.

3. The combine harvester of claim 2 further comprising a filler plate mounted to a forwardmost concave frame member proximate to said concave extension, said filler plate being adjustably positionable relative to said forwardmost concave frame member and to said concave extension.

4. The combine harvester of claim 3 wherein said filler plate is rotatable mounted on one of said mounting members, said filler plate having a slotted hole therein engageable with said fastener to rotatably fix said filler plate relative to said concave frame member.

5. The combine harvester of claim 4 wherein said mounting members are pins mounted in said concave frame members and said engagement means is a clevis.

6. The combine harvester of claim 5 wherein said filler plate is mounted on the opposing side of said forwardmost concave frame member from said subframe assembly.

7. A concave extension connectable to a concave in a combine harvester for cooperation with a threshing and separating rotor, said concave having a pair of spaced apart frame members supporting a plurality of rub bars, comprising:
a subframe assembly supporting a number of rub bars and having a first end provided with an engagement means engageable with each of at least two mounting members affixed to each of said concave frame members and radially spaced with respect to said threshing and separating rotor to permit rotational movement of said concave extension relative to said concave frame members, said subframe assembly further having securing means associated with a hole in said second end of said concave extension and cooperable with aligned openings in said concave frame members to fix the rotative position of said concave extension relative to said concave frame members, both said first end and said second end of said concave extension being selectively positionable relative to said concave by the selective mounting of said engagement means on selected mounting members and by the selective engagement of said securing means with one of said openings to provide variable configurations of said concave extension rub bars relative to said concave rub bars.

8. The concave extension of claim 7 wherein said concave frame members are longitudinally spaced with respect to a flow of crop material fed between said rotor and said concave, said concave extension being provided with a filler plate rotatably supported on the forwardmost concave frame member for movement relative to both said forwardmost concave frame member and said concave extension.

9. The concave extension of claim 8 wherein said filler plate is rotatably mounted on said mounting member and has a slotted hole therethrough to permit engagement with said securing means to selectively fix the rotated position of said filler plate.

10. The concave extension of claim 9 wherein said concave frame members have two mounting members alternatively engageable with said engagement means to provide a greater range of selectable positions, said hole in said subframe assembly being alignable with a portion of said openings when said engagement means is engaged with one of said mounting members and alignable with another portion of said openings when said engagement means is engaged with the other of said mounting members.

11. The concave extension of claim 10 wherein said mounting members are pins mounted in the respective concave frame members, the first mounting member in said forwardmost concave frame member extending both fore-and-aft of said forwardmost concave frame member to permit said filler plate to be mounted forwardly of said forwardmost concave frame member and said subframe assembly to be mounted rearwardly of said forwardmost concave frame member and between said concave frame members, said engagement means being a clevis selectively engageable with either of said mounting pins.

* * * * *